United States Patent [19]
Ikeda et al.

[11] 3,860,706
[45] Jan. 14, 1975

[54] METHOD FOR CURING STOCK SYMPTOMS

[75] Inventors: Osamu Ikeda; Motohiko Kato, both of Tokyo, Japan

[73] Assignee: Dauch Seiyaku Company, Limited, Chuo-ku, Tokyo, Japan

[22] Filed: May 23, 1973

[21] Appl. No.: 363,161

[30] Foreign Application Priority Data
May 24, 1972 Japan.............................. 47-51467

[52] U.S. Cl. .............................. 424/180, 260/211.5
[51] Int. Cl. ........................... A01n 9/00, A01n 9/28
[58] Field of Search .................. 260/211.5; 424/180

[56] References Cited
UNITED STATES PATENTS
3,089,869  5/1963  Mauvernay ..................... 260/211.5
3,471,472  10/1969  Thiel et al ......................... 260/211.5

Primary Examiner—Elbert L. Roberts
Attorney, Agent, or Firm—Cushman, Darby & Cushman

[57] ABSTRACT

A shock symptom-curing preparation containing $N^6$-2'-0-dibutyryl adenosine-3',5'-cyclic-monophosphate (D-CAMP) or its salt and/or 2'-0-monobutyryl adenosine -3',5'-cyclic-monophosphate (M-CAMP) or its salt as active ingredient(s), and a method for curing shock symptoms by administering D-CAMP or its salt and/or M-CAMP or its salt.

3 Claims, 11 Drawing Figures

METHOD FOR CURING STOCK SYMPTOMS

This invention relates to a remedy for curing shock symptoms. More particularly, the invention pertains to a method for curing shock symptoms, characterized by administering $N^6$-2'-O-dibutyryl adenosine -3',5'-cyclic-monophosphate (D-CAMP) or its salt and/or 2'-O-monobutyryl adenosine -3',5'-cyclic-monophosphate (M-CAMP) or its salt, and to a shock symptom-curing preparation containing D-CAMP and/or M-CAMP as active ingredient.

Heretofore, many shocks such as shocks at the time of anesthesia, shocks after surgical operations, bleeding shocks, endotoxin shocks, etc. have been known. At the time of such shocks, there are observed in the living bodies such variations as decrease in amount of blood, reduction in amount of blood from the heart, blood pressure depression, frequent pulse, etc. It has been found that cyclic adenosine monophosphate (CAMP) is effective for several of the above-mentioned symptoms. However CAMP cannot be used clinically because when it is administered, the flow amount of renal artery blood quickly becomes small or the amount of excreted urine decrease, with the result that the symptoms become rather serious.

The present inventors made extensive studies on the therapy of shock symptoms by use of various substances to fine that the aforesaid D-CAMP or its salt and M-CAMP or its salt are effective for the said shocks and are excellent compounds which are clinically usuable without causing the decrease in flow amount of renal artery blood and the reduction in amount of excreted urine. Based on the above finding, the inventors have accomplished the present invention.

That is, the inventors examined the influence of D-CAMP and M-CAMP on the flow state of blood and on various factors of the blood coagulation systems of dogs and rabbits suffering from experimental endotoxin shocks to obtain excellent results. The above-mentioned influence is explained in detail below with reference to examples and accompanying drawings which show the influence of D-CAMP and M-CAMP on endotoxin shock, in which are also shown as controls the cases where no compound was administered. In the drawings, FIG. 1 shows the number of pulse;

EXAMPLE 1

Influence of D-CAMP and M-CAMP on flow state of blood:

Mongrel dogs of 13 kg. in average body weight were used as test animals, and were divided into a D-CAMP-administered group, an M-CAMP-administered group and a non-administered group (control group) (8 dogs per group), and the dogs of each group were measured in flow state of blood.

Figure 1:
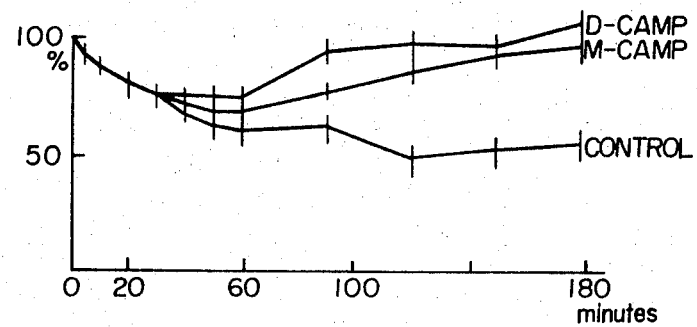
Figure 2:
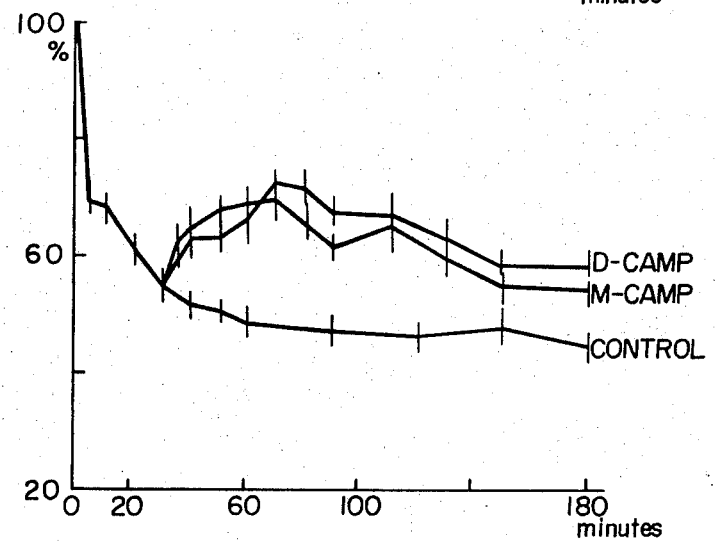
FIG. 2 shows the amount of blood from the heart.
Figure 3:
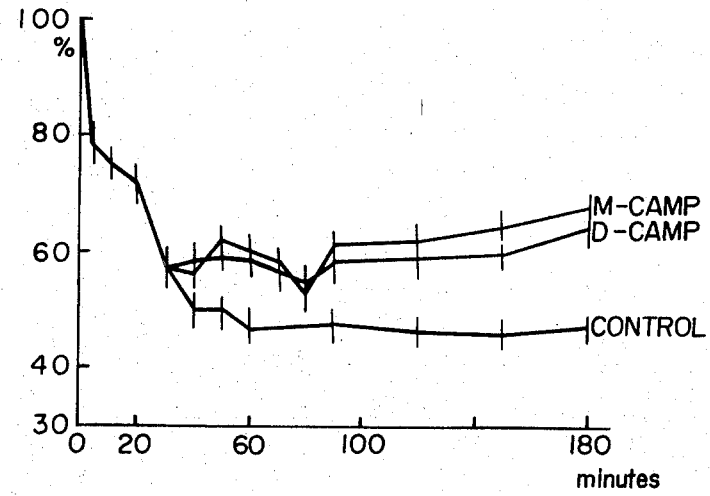
FIG. 3 shows the mean artery pressure.
Figure 4:
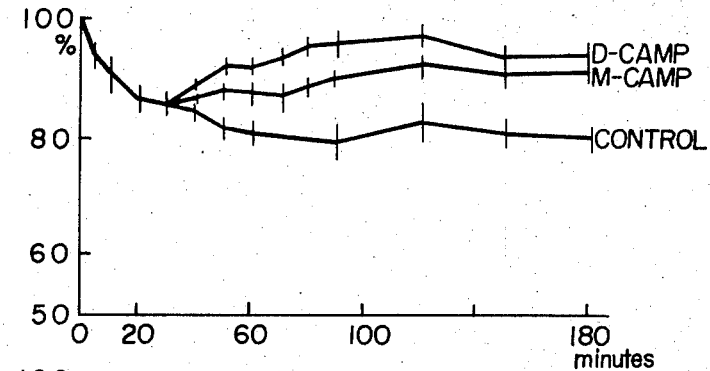
FIG. 4 shows the central venous pressure.
Figure 5:
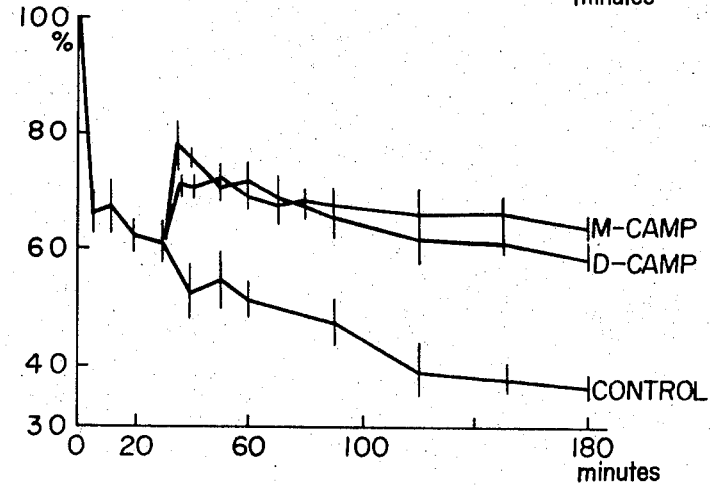
FIG. 5 shows the superior mesenteric artery blood flow.
Figure 6:
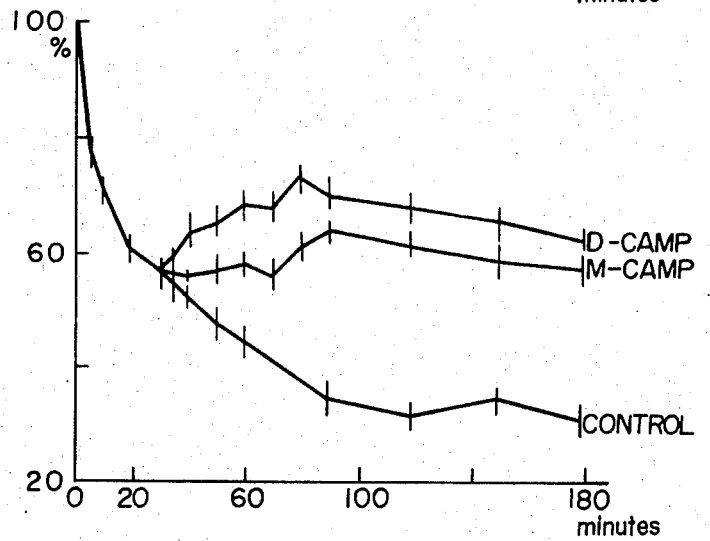
FIG. 6 shows the renal artery blood flow.
Figure 7:
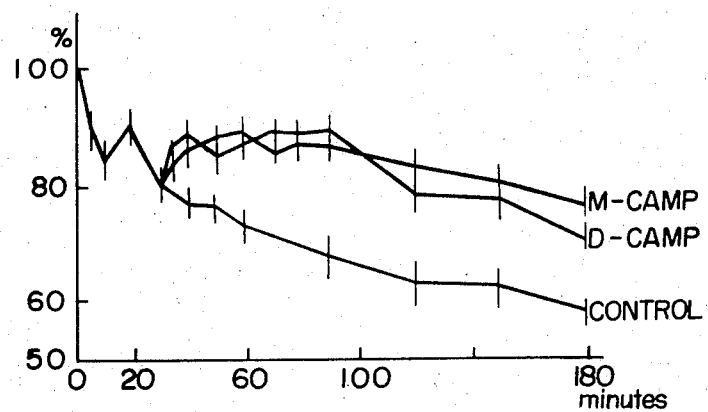
FIG. 7 shows the carotid artery blood flow.
Figure 8:
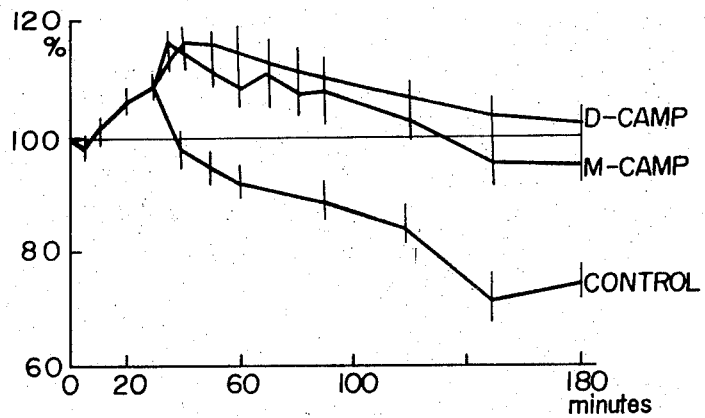
FIG. 8 shows the superior mesenteric artery blood flow distribution ratio.
Figure 9:
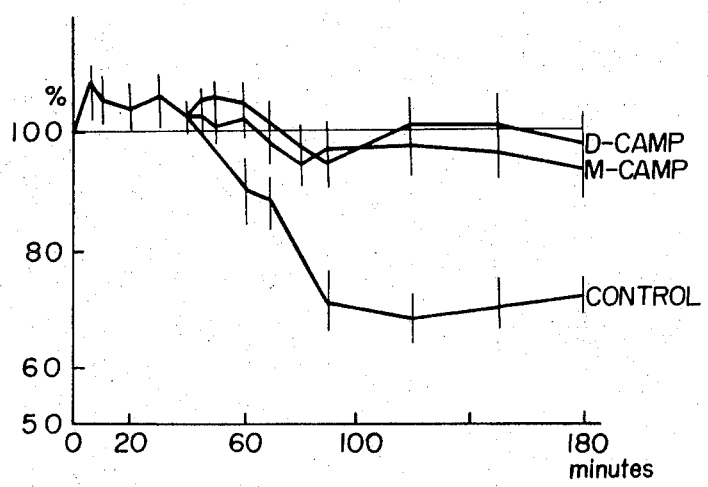
FIG. 9 shows the renal artery blood flow distribution ratio.
Figure 10:
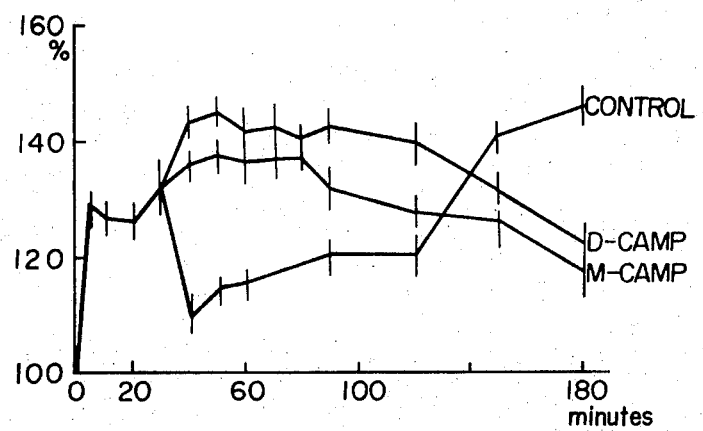
FIG. 10 shows the carotid artery blood flow distribution ratio.
Figure 11:
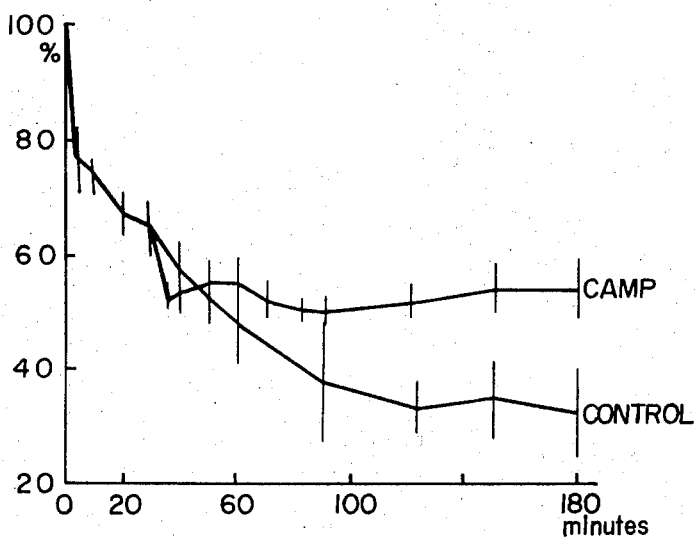
FIG. 11 shows the renal blood flow when adenosine-3',5'-cyclic-monophosphate was administered at the time of endotoxin shock.

Shock was induced by intravenously injecting 3 mg/kg of a purified Escherichia coli endotoxin within 30 seconds, and endotoxins of the same lot were used throughout the test. In the test, each dog was subjected to general anesthesia by intravenous injection of 0.3 ml/kg of a 1:1 mixture of diallyl barbituric acid and pentobarbital sodium, and a pulmotor was used to maintain an intermittent positive pressure respiration through a trachea cannula. Each compound was intravenously injected 30 minutes after administration of the endotoxin. The administration amount of D-CAMP was 3 mg/kg and that of M-CAMP was 5 mg/kg. In this case, variations in the amount of blood from the heart, the mesenteric artery blood flow, the renal artery blood flow and the carotid artery blood flow were measured by means of a rectangular wave electro-magnetic flow meter and, at the same time, the number of pulse, the mean artery pressure and the central venous pressure were measured to calculate the renal blood flow distribution ratio, the mesenteric blood flow distribution ratio and the carotid artery blood flow distribution ratio. These results, which were as shown in FIGS. 1 to 10, are as explained below.

1. Heart rate:

In the case of the control group, the heart rate gradually decreased after administration of the endotoxin and, after 120 minutes, lowered to a minimum value of 50%. In the case of each of the D-CAMP-administered group and the M-CAMP-administered group, the heart rate increased after administration thereof, and reached substantially 100% after 120 minutes in the case of the D-CAMP-administered group and after 150 minutes in the case of the M-CAMP-administered group.

2. Cardiac output:

In case of the control group, the cardiac output gradually lowered after administration of the endotoxin, reached substantially 48% after 60 minutes, and became constant thereafter. In the case of the D-CAMP-administered group and the M-CAMP-administered group, the cardiac output increased in the same way as above, and, after 70 minutes, restored to 73% and 70%, respectively.

3. Mean artery pressure:

In the case of the control group, the mean artery pressure lowered to substantially 47% in 60 minutes after administration of the endotoxin, and became constant thereafter. In the case of the D-CAMP-administered group and the M-CAMP-administered group, the mean artery pressures showed an increase in the same way as above, and, after 90 minutes, reached 58% and, 62%, respectively.

4. Central venous pressure:

In the case of the control group, the central venous pressure showed a gradual decrease after administration of the endotoxin and, after 60 minutes, lowered to substantially 80% and became constant. In the case of the D-CAMP-administered group and the M-CAMP-administered group, the central venous pressures gradually increased after administration of the endotoxin, and, after 120 minutes, showed maximum values of 98% and 94% respectively.

5. Superior mesenteric artery blood flow:

In the case of the control group, the superior mesenteric artery blood flow showed a gradual decrease after administration of the endotoxin, and, after 180 minutes, became substantially 37%. In the case of the D-CAMP-administered group and the M-CAMP-administered group, the flow amounts of said blood quickly increased to 78 and 71%, respectively, in several minutes after administration of the endotoxin, gradually decreased thereafter, and, after 180 minutes, became 58 and 65%, respectively.

6. Renal artery blood flow:

In the case of the control group, the renal artery blood flow gradually decreased and became 32% after 180 minutes. In the case of D-CAMP-administered group, the flow amount of said blood reached a maximum value of 73% after 80 minutes, and in the case of the M-CAMP-administered group, the flow amount reached a maximum of 64%. Thereafter, the said values of the two groups gradually decreased, but were significantly higher than that of the control group.

7. Carotid artery blood flow:

In the case of the control group, the carotid artery blood flow after administration of the endotoxin gradually decreased, and became 58 % after 180 minutes. In the case of the D-CAMP-administered group and the M-CAMP-administered group, the amounts of said blood increased to values of substantially 90% after administration of the endotoxin. Thereafter, the values of said two groups gradually decreased, but were higher than that of the control group.

8. Superior mesenteric artery blood flow distribution ratio:

In the case of the control group, the superior mesenteric artery blood flow distribution ratio lowered by several percentages in several minutes after administration of the endotoxin, and then increased to about 109 % within 30 minutes. Thereafter, the said value gradually decreased, and became 71% after 140 minutes. In the case of the D-CAMP-administered group and the M-CAMP-administered group, the distribution ratios of said blood flow showed maximum values of 115%, gradually decreased thereafter, and, after 180 minutes, became 103 and 95%, respectively.

9. Renal blood flow distribution ratio:

In the case of the control group, the renal blood flow distribution ratio increased by several percentages after administration of the endotoxin, gradually decreased after about 30 minutes, and showed a minimum value of 69% after 120 minutes. In the case of the D-CAMP-administered group and the M-CAMP-administered group, the distribution ratios of said blood flow showed values of substantially 100% after administration of the endotoxin.

10. Carotid artery blood flow distribution ratio:

In the case of the control group, the carotid artery blood flow distribution ratio quickly increased to 130% after administration of the endotoxin, gradually decreased after 30 minutes, reached a minimum value of 110% after 40 minutes, and then gradually increased to become 146% after 180 minutes. In the case of the D-CAMP-administered group and the M-CAMP-administered group, the distribution ratios of said blood flow showed increased values in 80 minutes after administration, the maximum values thereof being 145 and 138%, respectively, gradually decreased thereafter, and, after 140 minutes, showed values lower than that of the control group.

As is clear from the above results, D-CAMP and M-CAMP show cardiotonic actions, actions of increasing the flow amounts of blood of various important internal organs and actions of increasing the carotid pressure and the central venous pressure, and hence are expected to provide actions of curing various shock symptoms. Furthermore, they do not bring about any decrease of the renal artery blood flow, which is considered to be a cause for anti-urination action, and hence are clinically usable.

EXAMPLE 2

Influence of D-CAMP and M-CAMP on blood coagulation systems:

Rabbits of about 4 kg. in body weight were used as test animals, and were divided into a D-CAMP-administered group, an M-CAMP-administered group, and a non-administered group (control group) (five rabbits per group).

A catheter was inserted in the central vein of the ear of each rabbit, and an endotoxin and each compound were administered and the blood was taken up through the catherter. As the endotoxin was used the same purified Escherichia coli endotoxin as in Example 1. As the compound was used each of D-CAMP (3 mg/kg/hr; total 30 mg/kg) and M-CAMP (6 mg/kg/hr; total 60 mg/kg). Each compound was dissolved, together with the endotoxin (90 µg/kg/hr; total 900 µg/kg/hr) in an isotonic sodium chloride solution, which was then continuously administered by intravenous drip over a period of 10 hours. To the control group was administered only the endotoxin.

After 2, 4, 6 and 8 hours from initiation of administration of the compound, the blood was taken up to measure TEG (Thrombelastograph) and various factors of the blood coagulation system. The TEG was measured according to the method disclosed in the report of Hartert [Zeitschr. Ges. Exp. Med. 117, 189–203 (1951)], using an apparatus of Model 2601D manufactured by Hellige Co. The factors of the blood coagulation system were measured according to the method proposed by Maki et al. [Tohoku J. Exp. Med. 99, 347–360 (1969)]. The results obtained were as set forth in the following tables:

|  | Time (hr) | TEG r(mm)* | k(mm)** | ma(mm)*** |
|---|---|---|---|---|
| Control (Endotoxin 900µg/kg) | 2 | 33± 7 | 11± 4 | 62±11 |
|  | 4 | 40± 15 | 14± 5 | 49±13 |
|  | 6 | 49± 18 | 42±23 | 30±15 |
|  | 8 | 183± 43 | ∞ | 9± 5 |
| D-CAMP (Endotoxin 900µg/kg + D-CAMP 30mg/kg) | 2 | 31± 8 | 8± 2 | 61± 4 |
|  | 4 | 34± 6 | 11± 1 | 59± 3 |
|  | 6 | 43± 19 | 13± 6 | 63± 1 |
|  | 8 | 59± 22 | 22± 6 | 48±15 |
| M-CAMP (Endotoxin 900µg/kg + M-CAMP 60mg/kg) | 2 | 35± 6 | 9± 4 | 59± 7 |
|  | 4 | 37± 11 | 15± 2 | 58±10 |
|  | 6 | 50± 8 | 21±13 | 65±13 |
|  | 8 | 53± 17 | 29± 8 | 45±12 |

* r = reaction time
** k = coagulation rate
*** ma = maximum amplitude

| | Time (hr) | Number of blood platelets ($\times 10^4$) | Fibrinogen source (mg/dl) | Plasminogen ($\times 10^{-3}$ unit) | Prothrombin time (sec) | Partial thromboplastin time(sec) | Factor V (sec) | Factor VII (sec) | Factor VIII (sec) | Renal fibrin deposition degree (%) |
|---|---|---|---|---|---|---|---|---|---|---|
| Control (Endotoxin 900μg/kg) | 2 | 52.7±0.8 | 377±94 | 13.3±3.2 | 7.9±1.0 | 38.5±7.0 | 11.5±1.8 | 16.2±0.8 | 38.5±11.8 | |
| | 4 | 23.8±9.0 | 258±55 | 10.9±2.3 | 9.1±0.8 | 53.1±11.0 | | | | 93±6 |
| | 6 | 9.2±5.5 | 206±77 | 10.4±3.0 | 10.0±0.08 | 84.7±6.5 | | | | |
| | 8 | 3.3±1.0 | 179±69 | 7.8±2.5 | 10.0±1.4 | 101.0±16.5 | 15.2±2.9 | 17.4±0.6 | 57.4±13.0 | |
| D-CAMP (Endotoxin 900μg/kg + D-CAMP 30mg/kg) | 2 | 41.2±8.3 | 307±53 | 16.2±3.8 | 7.2±0.2 | 34.3±7.8 | 10.3±0.8 | 15.9±1.0 | 36.5±5.7 | |
| | 4 | 24.0±5.0 | 201±23 | 9.9±2.5 | 7.6±0.8 | 42.0±1.4 | | | | 3±3.7 |
| | 6 | 13.8±1.0 | 231±67 | 11.1±3.7 | 8.3±1.2 | 60.5±24.0 | | | | |
| | 8 | 6.8±0.8 | 319±12 | 9.7±3.0 | 8.3±0.5 | 43.7±7.5 | 11.4±1.4 | 15.4±2.7 | 51.3±0.4 | |
| M-CAMP (Endotoxin 900μg/kg + M-CAMP 60mg/kg) | 2 | 47.3±3.2 | 352±65 | 15.7±4.0 | 7.5±0.8 | 36.4±6.7 | 11.4±2.1 | 16.0±0.8 | 32.3±8.9 | |
| | 4 | 30.1±7.0 | 313±15 | 11.8±1.7 | 8.0±0.3 | 43.1±8.0 | | | | 7±4.5 |
| | 6 | 11.5±2.8 | 341±83 | 10.9±4.2 | 8.4±1.3 | 51.5±23.3 | | | | |
| | 8 | 5.2±1.1 | 345±23 | 8.9±2.6 | 9.5±0.7 | 40.3±10.7 | 13.2±1.8 | 16.3±1.1 | 48.3±4.2 | |

The above results clearly show that the TEG of the D-CAMP-administered group and the M-CAMP-administered group, as compared with that of the control group, were less in extension of reaction time ($r$) and coagulation rate ($k$) and did not tend to decrease in maximum amplitude ($ma$), and the factors of the blood coagulation system showed no decrease in fibrinogen source and no extension of partial thromboplastin time. It is therefore recognized that D-CAMP and M-CAMP have actions to overcome troubles of the distal blood coagulation systems. Further, in the pathological histological examination of renal blood vessel, the D-CAMP-administered group and the M-CAMP-administered group are less in deposition of fibrin than the control group, and thus display actions to overcome renal troubles. M-CAMP shows an effect substantially identical with that of D-CAMP, when it is used in one half the amount of D-CAMP. In administering to the human body, it is preferable to use D-CAMP in an amount within the range from 2 to 50 mg/kg, and M-CAMP in an amount within the range from 5 to 100 mg/kg. The compound is preferably administered according to intravenous injection, more preferably according to intravenous drip.

Alternatively, any administration procedure may be adopted depending on the kind of symptom and the object of administration. In order to prepare an isotonic injection, 2.5 to 5.0 g of the compound or its physiologically acceptable salt is dissolved in an isotonic solution such as for example physiological salt solution, a glucose solution, Ringer's solution, Rocke's solution, Hartmann's solution, a dextran solution, a sorbitol solution, a xylitol solution, plasma, blood or the like.

What is claimed is:

1. Remedy for curing shock symptoms comprising a dosage of $N^6$-2'-O-dibutyryl adenosine-3',5'-cyclic-monophosphate or 2'-O-mono-butyryl adenosine-3',5'-cyclic-monophosphate or a mixture thereof, said dosage being an amount effective to cure shock symptoms.

2. Remedy according to claim 1 wherein a dose is 2–50 mg/kg of $N^6$-2'-O-dibutyryl adenosine -3',5'-cyclic-monophosphate or 5–100 mg/kg of 2'-O-monobutyryl adenosine -3',5'-cyclic-phosphate.

3. Remedy according to claim 1 wherein 2.5 to 5.0 g of $N^6$-2'-O-dibutyryl adenosine -3',5'-cyclic-monophosphate or 2'-O-monobutyryl adenosine -3',5'-cyclic-monophosphate is dissolved in 1,000 ml of an isotonic solution selected from the group consist of physiological salt solution, Ringer's solution, Rocke's solution, Hartmann's solution, a dextran solution, a sorbitol solution, a xylitol solution, a glucose solution, plasma and blood.

* * * * *

UNITED STATES PATENT OFFICE
CERTIFICATE OF CORRECTION

Patent No. 3,860,706                Dated January 14, 1975

Inventor(s) IKEDA et al.

It is certified that error appears in the above-identified patent and that said Letters Patent are hereby corrected as shown below:

Please correct the spelling of the name of the Assignee.

The correct name of the Assignee is

-- Daiichi Seiyaku Company, Limited --.

Signed and sealed this 10th day of June 1975.

(SEAL)
Attest:

RUTH C. MASON
Attesting Officer

C. MARSHALL DANN
Commissioner of Patents
and Trademarks